United States Patent [19]

Morisawa et al.

[11] Patent Number: 4,595,087
[45] Date of Patent: Jun. 17, 1986

[54] DOG CLUTCH CONSTRUCTION WITH CIRCULARLY UNIFORM CONSTRUCTION COUPLING CLUTCH SLEEVE AND ACTUATING PISTON

[75] Inventors: Kunio Morisawa; Tadashi Kondo, both of Toyota, Japan

[73] Assignee: Toyota Jidosha Kabushiki Kaisha, Aichi, Japan

[21] Appl. No.: 582,100

[22] Filed: Feb. 21, 1984

[30] Foreign Application Priority Data

Feb. 26, 1983 [JP] Japan ................. 58-031627
Mar. 5, 1983 [JP] Japan ................. 58-036289
Sep. 21, 1983 [JP] Japan ................. 58-174838

[51] Int. Cl.$^4$ ........................................ F16D 13/22
[52] U.S. Cl. ....................... 192/67 R; 192/85 A; 180/247
[58] Field of Search ............ 192/67 R, 49, 85 A, 192/54; 403/1; 180/247

[56] References Cited

U.S. PATENT DOCUMENTS

| | | | |
|---|---|---|---|
| 2,177,212 | 10/1939 | Evrell | 192/67 R |
| 2,575,379 | 11/1951 | Benning | 192/67 R |
| 2,795,964 | 6/1957 | Short | 192/67 R |
| 2,855,768 | 10/1958 | Plano | 192/67 R |
| 2,948,557 | 8/1960 | Howe et al. | 192/67 R |
| 3,137,376 | 6/1964 | Schick | 192/67 R |
| 3,348,645 | 10/1967 | Sigg | 192/67 R |
| 3,425,527 | 2/1969 | Wolf | 192/67 R |
| 3,739,892 | 6/1973 | Liberty | 192/67 R |
| 3,894,619 | 7/1975 | Bibbens | 192/67 R |

FOREIGN PATENT DOCUMENTS 2036206 6/1980 United Kingdom ............ 192/67 R

Primary Examiner—Magdalen Y. C. Moy
Assistant Examiner—David A. Okonsky
Attorney, Agent, or Firm—Parkhurst & Oliff

[57] ABSTRACT

A dog clutch construction is provided for selectively rotationally connecting or disconnecting two coaxially arranged shafts. The dog clutch includes teeth on each shaft which are axially juxtaposed to each other. A toothed sleeve is engaged over the teeth. The sleeve is axially movable from a first position located on only one set of teeth to a second position located on both sets of teeth. A new meshing process is provided for meshing the teeth of the sleeve with the other two sets of teeth. A means for axially driving the sleeve from the first position to the second position is also provided, including an annular power piston positioned coaxially with the sleeve and a mechanism for transmitting the driving movement of the piston to the sleeve. The mechanism for tansmitting the driving movement is also annular and uniformly engaging around the sleeve and incorporates an axial resiliency to soften the driving action of the piston particularly at the instant of the meshing of the teeth of the sleeve with the other two sets of teeth, while ensuring uniform driving of the sleeve over all peripheral portions thereof.

10 Claims, 7 Drawing Figures

DOG CLUTCH CONSTRUCTION WITH CIRCULARLY UNIFORM CONSTRUCTION COUPLING CLUTCH SLEEVE AND ACTUATING PISTON

BACKGROUND OF THE INVENTION

The present invention relates to a dog clutch construction for a transmission device, and more particularly relates to such a dog clutch construction which can aid in avoiding the canting of a sleeve member thereof, as the dog clutch is engaged or disengaged. In particular, the present invention is suitable for application to a transmission system for a vehicle of the type in which, selectively, either the front wheels only can be powered, for use of the vehicle in relatively good road conditions such as on a paved road, or alternatively all four wheels can be powered, for use of the vehicle in relatively poor road conditions such as off the paved road surface. In such a vehicle, a power switching and transfer device is required which can switch the vehicle between single axle operation—i.e. front wheel drive only type operation—and double axle operation—i.e. front and rear wheel drive type operation or four wheel drive operation. Such a power switching and transfer device typically includes a dog clutch construction for engaging and disengaging the supply of rotational power to the rear wheels, and the problem of canting of the sleeve member of the dog clutch can become acute.

In detail, such a power switching and transfer device typically includes a power output shaft for outputting rotational power to the rear wheels of the vehicle, via a propeller shaft and a differential and rear axle assembly and so on, when and only when the vehicle is to be operated in four wheel drive mode, with the rear end of the power output shaft connected with regard to rotation to the front end of said propeller shaft, and a power input shaft the front end of which is supplied with rotational power from the main transmission of the vehicle which powers the front wheels thereof. These power input and power output shafts are typically mounted within a casing with their inner ends close to one another, and have dogs (i.e. toothed wheels) mounted or formed on said inner ends, these dogs being closely approached and opposed to one another. Further, typically a dog clutch sleeve member is generally formed as a hollow cylinder with its inner diameter substantially the same as the outer diameters of the toothed dogs, and is further formed on its inner surface with teeth corresponding in number and spacing to the teeth on the toothed dogs. This sleeve member is fitted over the toothed dogs so as to be slidable thereon in the axial direction between two extreme axial positions, in one of which extreme positions this sleeve member is located over and is rotationally engaged to only one of the toothed dogs, and in the other of which extreme positions the sleeve member is located over and is rotationally engaged to both of the toothed dogs. Further, a dog clutch drive member is typically provided, which can be driven to and fro (as for example by a piston of a hydraulic cylinder—piston assembly) in the axial direction of the power input shaft and the power output shaft for selectively either engaging the power input shaft to the power output shaft via the first and second toothed dogs and the sleeve member, or disconnecting the power input shaft and the power output shaft from one another, and this drive member is connected to the sleeve member by a means for doing so in such a way that they are kept substantially fixed with respect to one another with regard to movement along the axial direction of the power input shaft and the power output shaft while being allowed to rotate substantially freely with respect to one another around the axial direction.

Now, this sort of typical construction is subject to a considerable problem, because the means for connecting the drive member to the sleeve member has heretofore been such a construction as a fork member or shift fork, and since such a construction bears on the sleeve member at only two points of its circumference (typically diametrically opposite points, in fact), therefore a great risk has existed of forcible canting of the sleeve member, since inevitably a certain amount of play exists in the mounting of the sleeve member over the toothed dogs, and accordingly angling of the axis of the sleeve member with respect to the axis of the power input and output shafts is possible. In the case that such a fork member is used for shifting the sleeve member, when considerable force is thus being exerted on the sleeve member as for example when the teeth of the sleeve member are first being engaged with the teeth of the second dog (which are not engaged therewith when the transmission device is in the disengaged condition), then the sleeve member may very probably twist or cant with respect to the dogs, thus causing jerky engagement of the dog clutch construction and grating of the dogs and the sleeve member. This can also cause undue slowness of engagement of the dog clutch construction, and/or shock in the drive train of the vehicle incorporating it. Further, such a grating will naturally lead to quick wear on the dogs and on the sleeve member, which will cause the transmission to have an unduly short service life, and in the extreme case may even lead to premature failure thereof. Yet further, this problem tends to become accentuated by a feedback process, because such canting of the sleeve member while it is being slid on the dogs and especially while high torque load is being transmitted by the dog clutch causes quick wear on the dogs and on the inner part of the sleeve member, thus causing the abovementioned play therebetween to become greater, which in its turn allows more extreme canting of the sleeve member relative to the dogs.

SUMMARY OF THE INVENTION

Accordingly, it is the primary object of the present invention to provide a dog clutch construction for such a transmission device, which can minimize misalignment between the axis of such a sleeve member and the axis of the dogs thereof.

It is a further object of the present invention to provide such a dog clutch construction for such a transmission device, which minimizes forcible canting of the sleeve member due to the inevitable certain amount of play existing in the mounting of the sleeve member over the toothed dogs.

It is a further object of the present invention to provide such a dog clutch construction for such a transmission device, which minimizes angling of the axis of the sleeve member with respect to the axis of the dogs when considerable force is being exerted on the sleeve member as for example when the teeth of the sleeve member are first being engaged with the teeth of the dog which is not engaged with said sleeve member when the transmission device is in the disengaged condition.

It is a further object of the present invention to provide such a dog clutch construction for such a transmission device, which maximizes the smoothness of engagement.

It is a further object of the present invention to provide such a dog clutch construction for such a transmission device, which minimizes grating of the dogs and the sleeve member.

It is a further object of the present invention to provide such a dog clutch construction for such a transmission device, which minimizes the occurrence of undue slowness of engagement of the dog clutch construction.

It is a further object of the present invention to provide such a dog clutch construction for such a transmission device, which minimizes shock in the drive train of the vehicle incorporating it.

It is a further object of the present invention to provide such a dog clutch construction for such a transmission device, which does not suffer from quick wear on the dogs and on the sleeve member.

It is a further object of the present invention to provide such a dog clutch construction for such a transmission device, which is not subject to quick wear on the dogs and on the inner part of the sleeve member which would cause the play between the sleeve member and the dogs to become greater which in its turn would allow more extreme canting of the sleeve member relative to the dogs.

It is a yet further object of the present invention to provide such a dog clutch construction for such a transmission device, which ensures a long life for the transmission as a whole.

It is a yet further object of the present invention to provide such a dog clutch construction for such a transmission device, which ensures high reliability of the transmission during use.

According to the most general aspect of the present invention, these and other objects are accomplished by, in a transmission device comprising a casing and a power output shaft and a power input shaft both rotatably and coaxially mounted within said casing with their inner end portions close to one another: a dog clutch construction comprising: a first toothed dog fixed to said power input shaft; a second toothed dog of substantially the same diameter as said first toothed dog and having the same number of teeth as said first toothed dog and fixed to said power output shaft, one side of said second toothed dog being closely approached to one side of said first toothed dog; a sleeve member generally formed as a hollow cylinder with its inner diameter substantially the same as the outer diameters of said first and second toothed dogs, and further formed on its inner surface with teeth corresponding in number and spacing to the teeth on said first and second toothed dogs, and fitted over said first and second toothed dogs so as to be slidable thereon in the axial direction between two extreme axial positions, in one of said extreme axial positions said sleeve member being located over and being rotationally engaged to only one of said toothed dogs, and in the other of said extreme axial positions said sleeve member being located over and being rotationally engaged to both of said toothed dogs; a dog clutch drive member; a means for driving said dog clutch drive member to and fro in the axial direction of said power input shaft and said power output shaft for selectively either engaging said power input shaft to said power output shaft via said first and second toothed dogs and said sleeve member, or disconnecting said power input shaft and said power output shaft from one another; and a means for keeping said dog clutch drive member and said sleeve member substantially fixed with respect to one another with regard to movement along the axial direction of said power input shaft and said power output shaft while allowing said sleeve member to rotate substantially freely with respect to said dog clutch drive member around said axial direction; said means for keeping said dog clutch drive member and said sleeve member substantially fixed with respect to one another with regard to movement along said axial direction bearing on said sleeve member substantially uniformly around its periphery.

According to such a construction, as the dog clutch drive member drives the sleeve member axially along said first and second dogs, it does not tend substantially to cant said sleeve member, i.e. to tilt its axis relative to the axis of the power input and power output shafts, because said means for keeping said dog clutch drive member and said sleeve member substantially fixed with respect to one another with regard to movement along said axial direction bears on said sleeve member substantially uniformly around its periphery, and hence exerts no tilting effect thereon. Thus, even there is inevitably a certain amount of play existing in the mounting of the sleeve member over the first and second toothed dogs, angling of the axis of the sleeve member with respect to the axis of the dogs is minimized, especially when considerable force is being exerted on the sleeve member as for example when the teeth of the sleeve member are first being engaged with the teeth of that dog which is not engaged with said sleeve member when the transmission device is in the disengaged condition. Thus, the smoothness of engagement is maximized. Also grating of the dogs and the sleeve member together is kept to a minimum, and the occurrence of undue slowness of engagement of the dog clutch construction is as far as possible avoided. Thus also shock in the drive train of the vehicle incorporating the tranmission device is minimized. Further, wear on the dogs and on the sleeve member is reduced considerably. Also, the play between the sleeve member and the dogs is prevented from increasing quickly, and thus more extreme canting of the sleeve member relative to the dogs is prevented. This accordingly prolongs the life of the transmission as a whole, and increases its reliability during use.

Further, according to a more particular aspect of the present invention, these and other objects are more particularly and concretely accomplished by such a dog clutch construction as explained above, wherein said means for keeping said dog clutch drive member and said sleeve member substantially fixed with respect to one another with regard to movement along said axial direction is a bearing, in particular a ball bearing. This is a particularly simple and convenient construction for employment.

Further, according to a more particular aspect of the present invention, these and other objects are yet more particularly and concretely accomplished by such a dog clutch construction as explained above, wherein said bearing has an inner race and an outer race, said inner race being fitted around said sleeve member and said outer race being fixed to said dog clutch drive member, with a certain radial gap being left between said inner race and said sleeve member. This can be very helpful during assembly of the transmission device, for absorbing misalignment between the axes of the various parts thereof caused by the inevitable manufacturing inaccuracies.

Further, according to a more particular constructional aspect of the present invention, these and other objects are yet more particularly and concretely accomplished by such a dog clutch construction as explained above, wherein said sleeve member is formed with a circumferential step and a circumferential groove on its outer surface, and further comprising a snap ring fitted in said groove, said inner race of said bearing being held on the outer surface of said sleeve member between said snap ring and said circumferential step. In this case, the construction may optionally further comprise a collar fitted around said sleeve member between said snap ring and said inner race of said bearing. In this case, if as explained above a certain radial gap is left between said inner race and said sleeve member, then the inner race can slide conveniently on this collar. Also, the dog clutch drive member may be formed with a circumferential step and a circumferential groove on its inner surface, and the construction may further comprise a snap ring fitted in said groove, said outer race of said bearing being held on the inner surface of said dog clutch drive member between said snap ring and said circumferential step. This is also a useful constructional feature.

On the other hand, according to another more particular aspect of the present invention, these and other objects are more particularly and concretely accomplished by such a dog clutch construction as first explained above, wherein said means for driving said dog clutch drive member to and fro in said axial direction comprises a piston which reciprocates in a pressure chamber, a means for selectively supplying said pressure chamber with pressurized hydraulic fluid, a means for biasing said piston in the direction to reduce the size of said pressure chamber, and a means for communicating said reciprocating motion of said piston to said dog clutch drive member. In this case, said means for communicating said reciprocating motion of said piston to said dog clutch drive member may comprise a means for biasing said piston and said dog clutch drive member apart along said axial direction in the relative mutual direction to reduce the size of said pressure chamber with a biasing force greater than the biasing force provided by said means for biasing said piston in the direction to reduce the size of said pressure chamber, and a stop means for preventing said piston and said dog clutch drive member from thus moving apart to relative positions separated by more than a first certain predetermined distance. This introduces a very beneficial cushioning effect in the operation of the dog clutch, as will be explained in detail later in this specification. Further, the construction may typically comprise a stop means for preventing said piston and said dog clutch drive member from moving together along said axial direction in the relative mutual direction to increase the size of said pressure chamber to a distance less than a second certain predetermined distance. For reasons to be also explained later, it is desirable that the difference between said first predetermined distance and said second predetermined distance should be substantially less than the total stroke of said piston. Now, said means for biasing said piston in the direction to reduce the size of said pressure chamber may comprise a spring seat and a spring which bears against said spring seat, and may further comprise a snap ring mounted in a groove in the inside of said casing, with said spring seat being of generally annular shape and being pressed against said snap ring by said spring. In this case, according to a particular novel and useful constructional specialization of the present invention, said spring seat may be made from material generally thinner than the width of said groove, and said spring seat may have portions on its outer periphery which are thicker than said width of said groove. This is useful, as explained later, for facilitating assembly of the device as a whole. As a constructional convenience, said thickened portions of said spring seat may be indented portions.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENT

Figure 1:
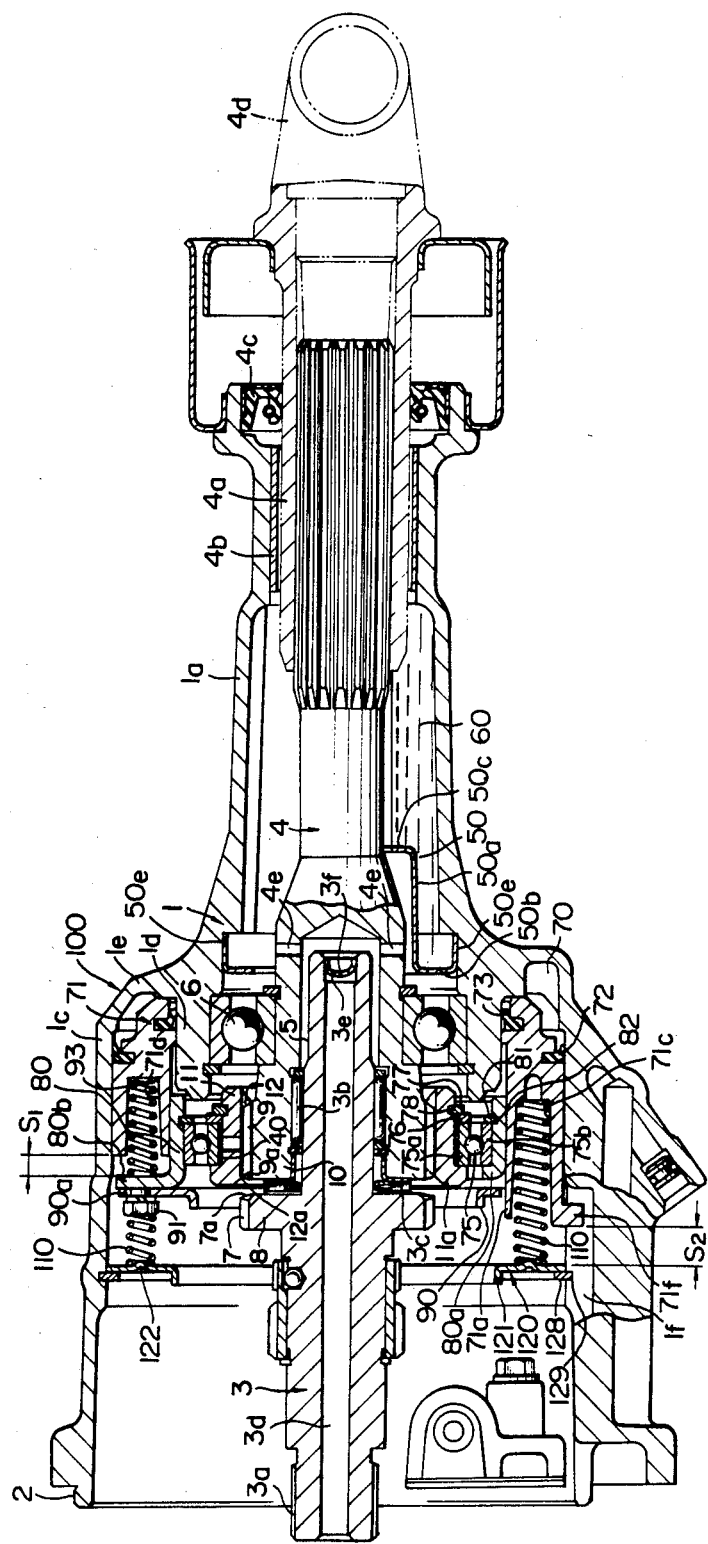
FIG. 1 is a longitudinal sectional view of a power switching and transfer device for use in a four wheel drive type vehicle, incorporating a dog clutch construction which is the preferred embodiment of the present invention.

The present invention will now be described with reference to the preferred embodiment thereof, and with reference to the appended drawings. FIG. 1 is a longitudinal sectional view of a power switching and transfer device, generally designated by the reference numeral 100. This device 100 has a housing 1, which is formed as an extension housing adapted to be secured to a transmission, not shown in the figures, of an automotive vehicle by a connecting surface 2 at the left hand side of said housing 1 in the figure (corresponding to the front end thereof with regard to the longitudinal axis of the vehicle). In fact, this vehicle is of the type described hereinbefore in which, selectively, either the front wheels only can be powered, for use of the vehicle in relatively good road conditions such as on a paved road, or alternatively all four wheels can be powered, for use of the vehicle in relatively poor road conditions such as off the paved road surface; and this power switching and transfer device 100 is the means for thus selectively providing rotary power to the rear wheels of the vehicle, as will be explained in detail later. This device 100 incorporates a dog clutch construction which is the preferred embodiment of the dog clutch construction of the present invention.

In detail, the transmission system (not shown) to which the device 100 is fixed by the connecting surface 2 comprises a gearbox, a front axle differential, drive shafts, constant velocity joints, and so on, and is so constituted as always to provide rotary power to the front wheels of the vehicle, of course when the engine is being appropriately driven. Also, this transmission system provides an uninterrupted supply of rotary power to the left hand end in the figure of an intermediate shaft 3 of the power switching and transfer device 100, said left hand end of said shaft 3 being located generally in the plane of said connecting surface 2 and being provided with splines 3a for engaging with and being supported by some appropriate rotating member, not particularly shown, of said transmission. The right hand end portion of said intermediate shaft 3 is inserted into an axial hole 5 formed in the left hand end in the figure of a power output shaft 4, and is rotatably supported therein with regard to sidewise or radial movement by a needle roller bearing 3b. Further, this intermediate shaft 3 is provided at its portion just to the left of its said right hand end with an integrally formed first dog clutch member or toothed wheel 8, which bears outer teeth 7 for providing dog clutch action as will be seen hereinafter, the right hand ends in the figure of these teeth 7 being formed as chamfered portions 7a; and between said first dog clutch member 8 and the left hand end of the power output shaft 4 there is provided a thrust bearing construction 3c of a per se well known type incorporating needle rollers for supporting axial pressure therebetween.

The power output shaft 4 is supported near its left end in the figure from the housing 1 by a ball bearing 6 fitted therebetween, and projects to the right in the figure along inside the central hole in an extended projecting portion 1a of the housing 1 defined to the right in the figure of the ball bearing 6 and into an axial hole formed in the end of a power output member 4a, being rotationally engaged to said power output member 4a by splines. This power output member 4a is rotatably supported in the right hand end of the projecting portion 1a of the housing 1 by a bearing 4b, and projects out from the right hand end of said projecting portion 1a of said housing 1, being then coupled to a universal joint device 4d (only schematically shown) which (for example) leads to a propeller shaft which in its turn leads to a differential which transfers power to the rear wheels of the vehicle. An oil seal 4c is provided between the power output member 4a and the projecting portion 1a of the housing 1 to prevent escape of lubricant out from said housing 1.

The left hand end of the power output shaft 4 is also provided with an integrally formed second dog clutch member or toothed wheel 10, which is of the same diameter as the first dog clutch member 8 and is directly axially opposed thereto, and which likewise bears outer teeth 9 for providing dog clutch action, of the same number as the teeth 7 and identically spaced, the left hand ends in the figure of these teeth 9 being formed as chamfered portions 9a. A dog clutch sleeve member 11 of a tubular shape bearing inner teeth 12 is fitted over the first and second dog clutch members 8 and 10 and is slidable thereon in the left and right directions in the figure. The left and right hand ends in the figure of these teeth 12 are formed as chamfered portions 12a. Thus, when the sleeve member 11 is slid to the right, i.e. is in the position shown in FIG. 1, it does not rotationally couple together the first dog clutch member 8 and the second dog clutch member 10, and thus the intermediate shaft 3 is not rotationally coupled to the power output shaft 4, thus leaving the vehicle in the two wheel drive type operational mode in which the front wheels only thereof are powered; but, on the other hand, when the sleeve member 11 is slid to the left from the position shown in FIG. 1, it rotationally couples together the first dog clutch member 8 and the second dog clutch member 10 via the outer teeth 7 and 9 formed on them which are rotationally engaged with the inner teeth 12 formed on the sleeve member 11, and thus the intermediate shaft 3 is rotationally coupled to the power output shaft 4, and rotational power is transmitted therethrough from the gearbox of the vehicle (not shown) to the rear wheels thereof, thus providing four wheel drive operation for the vehicle in which the rear wheels thereof are powered as well as the front wheels.

A central axial oil hole designated by the reference numeral 3d is formed as extending down the length of the intermediate shaft 3, and the right hand end in the figure of this axial oil hole 3d is closed by a cap 3e, through which a small orifice 3f is pierced. Thus, while the vehicle is being operated, lubricating oil passes from the interior of the gearbox (not shown) of the vehicle down through this oil hole 3d in the rightwards direction as seen in the figure, and passes out through the orifice 3f in the cap 3e in a flow amount determined by the size of said orifice 3f, to enter into the hole 5 formed in the power output shaft 4. From this hole 5, some of this lubricating oil flows leftwards in the figure past the roller bearing 3b and the thrust bearing 3c, while lubricating them, to then lubricate the various dog clutch mechanisms within the casing 1, while on the other hand the remainder of this lubricating oil passes through a plurality of radially extending orifices 4e formed in the power output shaft 4 and communicating to the hole 5, to pass to the outside of the power output shaft 4; the subsequent path of this transmitted lubricating oil will be explained later.

The arrangements, particularly according to the gist of the present invention, for driving the sleeve member 11 in the left and right directions in FIG. 1, so as thus to selectively either engage four wheel drive for the vehicle or to leave only two wheel drive engaged, will now be described.

The portion of the housing 1 around the sleeve member 11 is formed so as to define a cylindrical pressure chamber 70 by the cooperation of an outer cylindrical portion 1c and an inner cylindrical portion 1d which extends from a base portion 1e coaxially within said outer cylindrical portion 1c. The pressure chamber 70 is coaxial with the intermediate shaft 3 and the power output shaft 4. A conduit not shown in the figure is provided for selectively providing pressurized hydraulic fluid to said pressure chamber 70. An annular piston 71 (shown in detail in FIG. 2) is slidably mounted in said pressure chamber 70, so as to be able to move in the left and right directions in FIG. 1 according to the pressure in said pressure chamber 70, and an external seal 72 and an internal seal 73 are provided on the side of the piston 71 towards the pressure chamber 70 for ensuring that hydraulic fluid cannot escape in substantial quantity from the pressure chamber 70 to the inside of the casing 1. The piston member 71 is formed with a protrusion 71f extending radially outwards from its left hand end in the figures, and this protrusion 71f engages with a longitudinally extending groove 1f formed in the inner shape of the casing 1, so that the piston member 71 is prevented from rotating in the casing 1, although of course it can axially reciprocate therein.

The inner part of this annular piston 71 is constrained with regard to movement in the axial direction with respect to the sleeve member 11, while on the other hand being freely rotatable with respect thereto, by a construction which will now be described.

The inner race 75a of a radial ball bearing 75 is secured around the outer surface of the dog clutch sleeve 11 by being fitted over said outer surface and by being squeezed between a step 11a defined on said outer surface of the clutch sleeve 11 and a collar 76, which is held in place by a snap ring 77 which is snappingly fitted into a circumferential groove 78 formed in said outer surface of said clutch sleeve 11. A certain radial gap 40 is left between the inner surface of said inner race 75a of said radial ball bearing 75 and the outer surface of said clutch sleeve 11, so as to be able to absorb misalignment of the various parts during assembly of the device. The outer race 75b of this radial ball bearing 75 is secured within the inner cylindrical surface of a drive member 80 by being fitted into said inner cylindrical surface and by being squeezed between a plurality of inwardly extending ear portions 80a projecting inwards from said inner cylindrical surface of the drive member 80 and a snap ring 81, which is held in place by being snappingly fitted into a circumferential groove 82 formed in said inner cylindrical surface of said drive member 80. Thus, the drive member 80 is fixed to the sleeve member 11 with regard to movement in the axial direction, while on the other hand being freely rotatable with respect thereto by the rotating action of the ball bearing 75.

Figure 2:
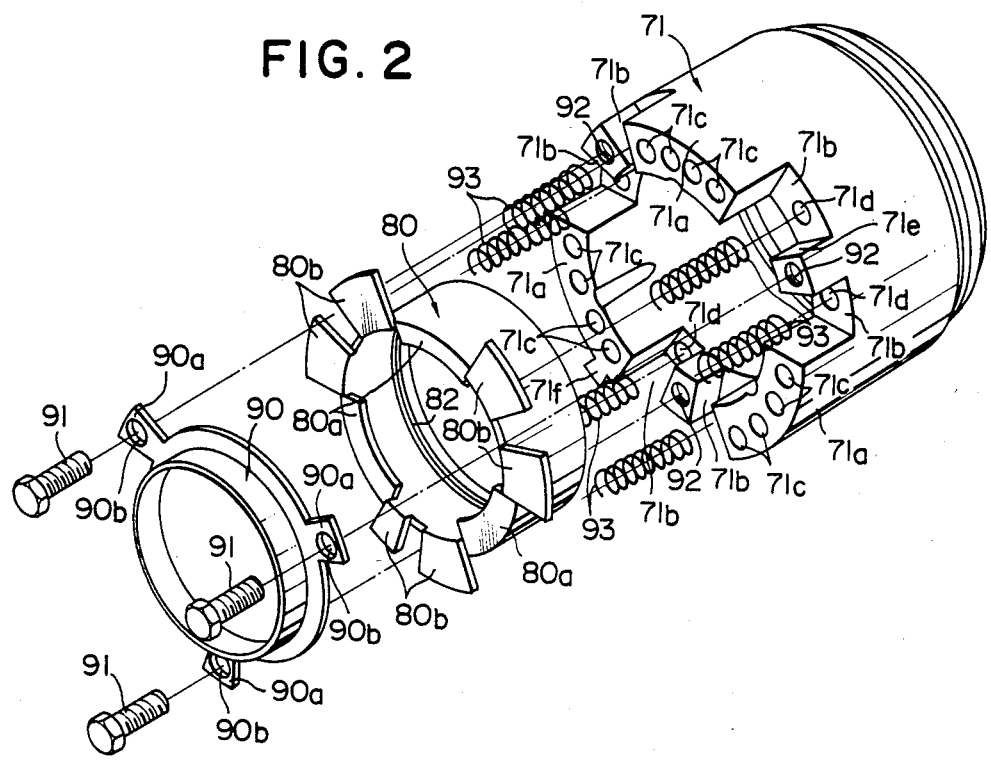
FIG. 2 is a perspective view of an annular piston member utilized in said power switching and transfer device, along with a drive member and a stop member and various auxiliary parts.

This drive member 80 is best seen in FIG. 2, which is a perspective view thereof along with the annular piston member 71 and with a stop member 90 which will be explained hereinafter and with various auxiliary parts. Here it will be seen that the drive member 80 is formed generally as a hollow cylindrical member, but with, at its left hand end in the figures, said plurality of inwardly extending ear portions 80a, and also with a plurality of outwardly extending ear portions 80b. The outward ear portions 80b fit each into a corresponding notch shape 71b provided as formed in the left hand end in the figures of the annular piston member 71, these notch shapes being defined between alternate wide axial protrusions 71a and narrow axial protrusions 71e extending from the left hand end in the figures of said annular piston member 71, with the outer surface of the main cylindrical body of the drive member 80 fitting within the inner surface of the inner hole of the annular piston member 71 and sliding thereagainst, so that the piston member 71 is able to move in the axial direction with respect to the drive member 80 but is not able to rotate or move in other ways with respect thereto. The stop member 90 is formed as a flat annular ring with a cylindrical annular ring secured to its inner circumference and with a plurality of outwardly protruding ear portions 90a with holes 90b formed therein; and this stop member 90 is secured to the ends in the left hand direction in the figures of the narrow axial protrusions 71e of the piston member 71 by bolts 91 which pass through the holes 90b of the ear portions 90a and are screwed into bolt holes 92 formed in said protrusions 71e. Thus, the stop member 90 positively prevents the drive member 80 from coming away from the piston member 71, by trapping the outwardly protruding ear portions 80b of the drive member 80 in the notch shapes 71b of the piston member 71.

Between the outwardly protruding ear portions 80b of the drive member 80 and the notch shapes 71b of the piston member 71 are provided biasing compression coil springs 93, the one ends of which bear against the inner sides of the ear portions 80b, and the other ends of which are seated inside blind holes 71d formed in the bottoms of the notch shapes 71b, so as to hold said compression coil springs 93 in place with a certain prestressing being provided. Thereby, the drive member 80 is biased in the leftwards direction in the figures with respect to the piston member 71, its movement in this direction however being limited by the provision of the stop member 90. In FIGS. 1 and 2, the depth of the notch shapes 71b in the piston member 71 is indicated to be S1, which is accordingly the amount of biased relative motion available between said piston member 71 and said drive member 80.

The annular piston 71 and the drive member 80 and the sleeve member 11, etc., are biased in the rightward direction in the figure, i.e. in the direction to reduce the volume of the annular pressure chamber 70, and are also limited with respect to the total distance through which they can travel axially, by a biasing construction which will now be described.

Each of the wide axial protrusions 71a of the annular piston 71 is formed with several (four in the shown preferred embodiment) axially extending blind holes 71c, and into each of these blind holes 71c is fitted one end of one of a plurality of return compression coil springs 110. The other ends of these return compression coil springs 110 bear against an annular spring seat member 120, which is particularly shown in FIGS. 3 through 5, and which is fixed relative to the casing 1 of the power switching and transfer device 100. Thus, the total travel distance through which the annular piston 71 can move is as shown by S2 in FIG. 1 (the piston 71 is shown at its extreme rightmost position in FIG. 1); and the piston 71 is biased in the rightwards direction in the figure by the return compression coil springs 110. Particularly, for reasons which will become clear later, the distance S2 is arranged to be substantially greater than the above defined distance S1, and also the total biasing force which the return compression coil springs 110 exert on the piston 110 is arranged to be substantially less than the total biasing force on said piston exerted by the buffer compression coil springs 93: this is done by ensuring that the prestressing of the return compression coil springs 110 is substantially less than the prestressing of the buffer compression coil springs 93, and also that the spring constant of the return compression coil springs 110 is substantially less than the spring constant of the buffer compression coil springs 93.

Figure 3:
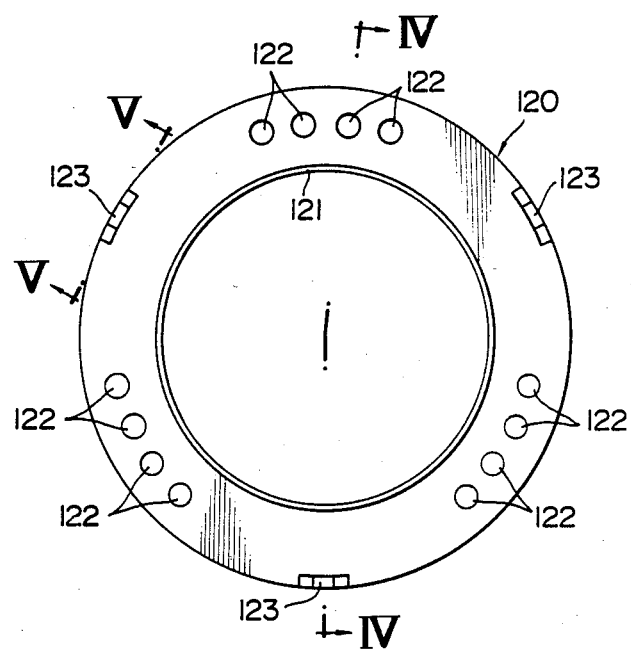
FIG. 3 is a plan view of an annular spring seat member used for seating certain return springs in said power switching and transfer device shown in FIGS. 1 and 2.
Figure 4:
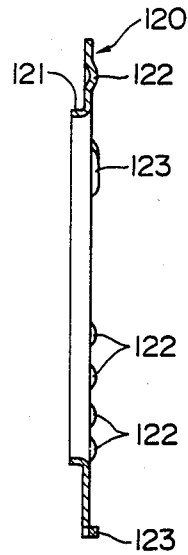
FIG. 4 is a sectional view of said spring seat member taken in a plane containing the central axis thereof and indicated by the arrows IV—IV in FIG 3.
Figure 5:
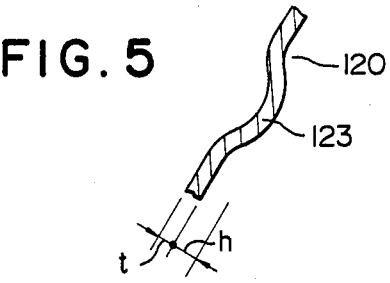
FIG. 5 is a sectional side view of an outer peripheral portion of said spring seat member including an axially extending protrusion formed thereon, and indicated by the arrows V—V in FIG. 3.

In detail, FIG. 3 shows a plan view of the spring seat member 120, FIG. 4 is a sectional view of said spring seat member 120 taken in a plane indicated by the arrows IV—IV in FIG. 3, i.e. in a plane containing the central axis thereof, and FIG. 5 is a sectional side view of an outer peripheral portion of said spring seat member 120 including an axially extending protrusion 123 formed thereon and taken in a plane indicated by the arrows V—V in FIG. 3. This spring seat member 120 is formed of a piece of bent sheet metal of thickness denoted in the figures by "t", and is made as a flat annulus with a pressed short cylindrical annular portion 121 at its central portion for reinforcement purposes. The outer periphery of this spring seat member 120 is located just to the right in the figure of a snap ring 128 which is fitted into a circumferential snap ring groove 129 formed in the inner surface of the casing 1, and is pushed against said snap ring 128 by the pressing action of the return compression coil springs 110. Thereby the spring seat member 120 is kept in place, when the device has been assembled. Typically, as suggested in the figure, the widths of the snap ring 128 and of the snap ring groove 129, i.e. their axial extents, are greater than the thickness "t" of the material of the spring seat member 120.

On the flat annular portion of the spring seat member 120 there are formed a plurality of pressed protrusions 122, each corresponding to one of the plurality of return compression coil springs 110, for fitting into and locating and keeping in place the left hand ends in the figure of said return compression coil springs 110. These protrusions 122 may be of any convenient height, i.e. axial extent. Further, according to a special novel constructional feature, also on the outer circumference of the spring seat member 120 there are formed a plurality of axially extending protrusions 123 of height approximately as shown by "h" in FIG. 5, which in the shown particular construction are formed by pressing a portion of the material of the peripheral portion of the annular spring seat member 120 out of its general plane for about said certain distance "h", and which extend in the same axial direction as do the protrusions 122. This height "h" of the protrusions 123 is so arranged that the sum t+h of said height of said protrusions 123 and the thickness of the material of the spring seat member 120 is greater than the axial thickness of the snap ring 128 and the corresponding snap ring groove 129.

Thus, when the power switching and transfer device 100 is being assembled into its casing 1, after the parts including the annular piston 71 and the drive member 80 and the sleeve member 11, etc. have been fitted into the casing 1 from its open left hand end as seen in FIG. 1, then the return compression coil springs 110 are fitted into the blind holes 71c of the piston 71. Next, the spring seat member 120 is inserted into the casing 1 and approached to these springs 110, with each of said springs 110 resting against its corresponding protrusion 122, and then said spring seat member 120 is pressed squarely towards the piston member 71 (which naturally at this time is at the bottom of its travel in the pressure chamber 70), so as to evenly compress the compression coil springs 110. When the spring seat member 120 has been thus pressed in the right hand direction in the figure so far as to have passed the snap ring groove 129 formed on the inside of the casing 1, then the snap ring 128 is fitted into said groove 129 and released, and subsequently the spring seat member 120 can be released so as by the biasing action of the compression coil springs 110 to be held against said snap ring 128. Now if, during this assembly process, the spring seat member 120 should undesirably slip sideways, despite its location by the projections 122 engaging with the return compression coil springs 110, then because of the provision of the protrusions 123 said spring seat member 120 never can enter into or become engaged with the snap ring groove 129, because as mentioned above the total axial thickness of said spring seat member 120 at its portions incorporating said protrusions 123 is too great to enter into said snap ring groove 129, but instead always advances, being guided by the inner surface of the casing 1. This is very helpful for ensuring good assemblability of the power switching and tranfer device 100 as a whole, since such slipping of a return spring seat member into the snap ring groove for the snap ring that is supposed to retain the spring seat member is a well known problem associated with the assembly of transmission devices in general. Thus, this simple and ingenious construction incorporating the protrusions 123 positively avoids this assembly difficulty, and thus greatly facilitates the putting together of the shown power switching and transfer device. It should be noted that this concept is also applicable, mutatis mutandis, to the case in which the snap groove is an external groove on a shaft, and the spring seat member is held by its internal periphery, as well as to the shown case in which the snap groove is an internal groove on the transmission device casing, and the spring seat member is held by its external periphery.

This means for driving the sleeve member 11 in the left and right directions in FIG. 1 functions as follows.

The position of the apparatus illustrated in FIG. 1 is that in which the annular piston 71 is at its extreme position to the right in the figure, i.e. towards the rear of the vehicle incorporating the transmission device, with the pressure chamber 70 at its smallest volume, because of the biasing action of the return compression coil springs 110, and with the distance between the ear portions 80b of the drive member 80 and the bottoms of the notch shapes 71b in the piston member 71 substantially equal to S1, i.e. with the drive member 80 displaced to its maximum extent leftwards in the figure with respect to the piston 71, due to the biasing influence of the buffer compression coil springs 93. At this time the drive member 80 is holding, via the ball bearing 75, the sleeve member 11 in the position shown in the figure in which the inner teeth 12 of said sleeve member 11 are only engaged with the outer teeth 9 of the second dog clutch member 10 integrally formed on the end of the power output shaft 4, and are not engaged with the outer teeth 7 of the first dog clutch member 8 integrally formed on the end of the intermediate shaft 3. Thus, in this state, as explained previously, the sleeve member 11 does not rotationally couple together the first dog clutch member 8 and the second dog clutch member 10, and thus the intermediate shaft 3 is not rotationally coupled to the power output shaft 4, and thus the vehicle is left in its two wheel drive type operational mode in which the front wheels only thereof are powered. Now, in order from this state to engage the four wheel drive operational mode in which the rear wheels also are powered, the pressure chamber 70 is supplied with pressurized hydraulic fluid via the means for doing so not shown in the figures, and this causes the annular piston 71 to be pushed to the left in FIG. 1 in a progressive manner.

For the first part of the movement of said annular piston 71, the return compression coil springs 110 only are compressed, because they are weaker than the buffer compression coil springs 93 and because the sliding of the sleeve member 11 on the second dog clutch member 10 (i.e. the sliding together of the respective teeth 12 and 9 thereof) takes place without any substantial resistance therebetween; and thus the distance S1 between the ear portions 80b of the drive member 80 and the bottoms of the notch shapes 71b in the piston member 71 remains substantially constant, and the drive member 80 is moved to the left in FIG. 1 together with the piston 71 by substantially the same amount, with the sleeve member 11 being likewise moved by substantially the same amount to the left in the figure by being pushed by the drive member 80 via the ball bearing 75, which is well able to transmit such axial pushing. As this occurs, since the sleeve member 11 is held from the drive member 80 via the ball bearing 80 which supports it uniformly around its entire circumference, the sleeve member 11 is moved while being held straight, and no tendency exists for the central axis of the sleeve member to become twisted or slanted with respect to the central axis of the intermediate shaft 3 and the power output shaft 4, in contrast to what is the case with a conventional type of construction in which the sleeve member 11 is held from the drive member 80, for example, via a fork type construction. This advantage is obtained by having the connecting construction between the drive member 80 and the sleeve member 11 be a rotationally symmetrical or isotropic construction.

This first stage of movement of the piston 71 continues until the chamfered portions 12a on the left hand ends in FIG. 1 of the inner teeth 12 of the sleeve member 11 come into contact with the chamfered portions 7a on the right hand ends in FIG. 1 of the outer teeth 7 of the first dog clutch member 8. Assuming that the engagement between these teeth is not exact, which will be the typical case, a severe resistance is then presented to the further movement of the sleeve member 11 to the left in the figure, and as the piston 71 is further driven to the left by the further supply of pressurized hydraulic fluid to the pressure chamber 70 now the buffer compression coil springs 93 will be started to be compressed, with the drive member 80 and the ball bearing 75 and the sleeve member 11 no longer moving to the left although the piston 71 is still moving to the left. As this movement progresses, the ear portions 80b of the drive member 80 move towards the bottoms of the notch shapes 71b in the piston member 71 as the buffer compression coil springs 93 continue to be compressed with the pressure between the chamfered portions 12a of the inner teeth 12 of the sleeve member 11 and the chamfered portions 7a of the outer teeth 7 of the first dog clutch member 8 steadily increasing. This process continues, with the pressure between the teeth 12 and the teeth 7 increasing, until these teeth engage together due to relative rotation between the intermediate shaft 3 and the power output shaft 4, i.e. until the teeth 7 enter between the teeth 12 and start to slide therebetween (and vice versa) with the sleeve member 11 again moving to the left in FIG. 1. Again, during this steady increase of the pressure between the sleeve member 11 and the first dog clutch member 8, the fact that the sleeve member 11 is being offered up squarely to the dog clutch member 8 and is being uniformly pressed thereagainst, which is a consequence as explained above of the use of a ball bearing 75 for connecting between the drive member 80 and the sleeve member 11, rather than a non rotationally symmetric construction such as a fork construction being employed, is very helpful for ensuring smooth and good eventual engagement of the teeth 12 and the teeth 9 together.

In fact, during this process of increasing the pressure between the chamfered portions 12a of the inner teeth 12 of the sleeve member 11 and the chamfered portions 7a of the outer teeth 7 of the first dog clutch member 8, if the resistance presented by the clash between the teeth 12 and 7 should be sufficiently great, then it may happen that the ear portions 80b of the drive member 80 may reach the bottoms of the notch shapes 71b in the piston member 71 with the buffer compression coil springs 93 compressed to their maximum possible extent; and then no further buffer action is available from these buffer springs 93, and the force subsequently exerted by the piston 71 is directly transmitted to the clashing engagement between the inner teeth 12 of the sleeve member 11 and the outer teeth 7 of the first dog clutch member 8, thus quickly forcing these teeth to become engaged together by a substantial increasing of the pressure therebetween. Further, it will be easily understood that as soon as these teeth 12 and 7 have started to become engaged together, the resistance to motion of the sleeve member 11 to the left in FIG. 1 will immediately be much diminished, and accordingly the compression of the buffer compression coil springs 93 will be suddenly released and the sleeve member 11 will be quickly pushed to the left in the figure, thus quickly completing the engagement between the sleeve member 11 and the first dog clutch member 8. This causes the intermediate shaft 3 to become rotationally coupled to the power output shaft 4, and thus rotational power is transmitted therethrough from the gearbox of the vehicle (not shown) to the rear wheels thereof, thus providing four wheel drive operation for the vehicle in which the rear wheels thereof are powered as well as the front wheels.

Even after rotational power has thus started to be transmitted through the teeth 12 and 7 from the intermediate shaft 3 to the power output shaft 4, the engagement between the teeth 12 and 7, i.e. between the sleeve member 11 and the first dog clutch member 8, may remain to be completed by further sliding of the sleeve member 11 to the left in the figure. In this case, the force required to move the sleeve member to the left may be considerably great, because of the friction caused between the teeth 12 and 7 by the power being transmitted therebetween. But, in any case, the pushing of the piston 71 will be sufficiently strong to accomplish this full engagement, if necessary with further compression of the buffer compression coil springs 93, perhaps even to the maximum extent described above in which the ear portions 80b of the drive member 80 reach the bottoms of the notch shapes 71b in the piston member 71. This is the reason that the maximum travel of the piston member, designated as S2, is set to be substantially greater than the distance S1, which is the maximum travel of the drive member 80 relative to the piston member 71, as defined above.

Finally, of course, when it is desired to disengage the four wheel drive type operational mode of the vehicle and to return to the two wheel drive type operational mode, simply the supply of pressurized hydraulic fluid to the pressure chamber 70 is discontinued, and then the return compression coil springs 110 will drive the piston member 70, the drive member 80, the ball bearing 75, and the sleeve member 11 rightwards in FIG. 1, thus disengaging the teeth 12 of the sleeve member 11 from the teeth 7 of the first dog clutch member 8 and allowing the intermediate shaft 3 and the power output shaft 4 to become rotationally disconnected. Again, the smooth and rotationally uniform holding action of the ball bearing 75 allows this disengagement to be performed smoothly without canting of the sleeve member 11 to one side or the other, such as might be the case if a fork arrangement were used for actuating the sleeve member 11.

Now, the path which the lubricating oil which has passed in the radially outward direction through the plurality of radially extending orifices 4e formed in the power output shaft 4 subsequently pursues, and the arrangements relating to said path, will be explained.

Figure 6A:
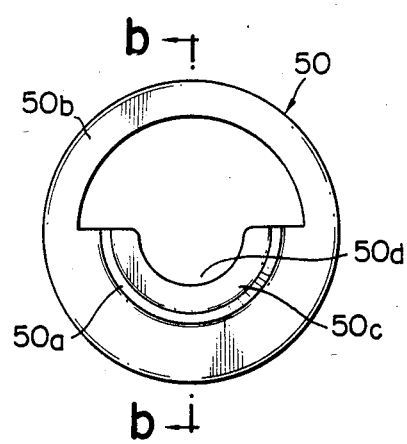
FIGS. 6(a) and 6(b) illustrate the construction of a lubricating oil shield cover which is fitted around a portion of a power output shaft so as to cause a lubricating oil pool to be formed therebelow, and show in view (a) this oil shield cover end on and in view (b) a sectional view thereof taken in a plane indicated by the arrows "B" in view (a).
Figure 6B:
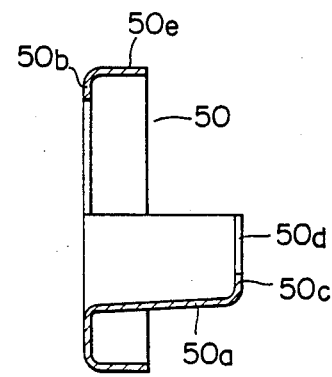

This oil sprays out in all radial directions upwards, downwards, and sideways from the orifices 4e as the power output shaft 4 rotates. A lubricating oil shield cover 50, the construction of which in this particular power switching and transfer device is illustrated in FIG. 6, is fitted around the portion of the power output shaft 4 just to the right in the figure of the ball bearing 6. In view (a) of FIG. 6, this oil shield cover 50 is seen end on as from the right in FIG. 1, and in view (b) of FIG. 6 a sectional view thereof is shown taken in the plane indicated by the arrows "B" in view 2(a). This oil shield cover 50 comprises a half tubular portion 50a, a base flange portion 50b formed as a flat annulus to half of whose circular inner periphery is joined the half circular periphery at one end of said half tubular portion 50a, an end wall portion 50c which is formed as half of a flat annulus to whose outer half circular periphery is joined to half circular periphery at the other end of said half tubular portion 50a (the semicircular notch in the middle of said end wall portion 50c being denoted in the figures by the reference symbol 50d), and a base fitting portion 50e, which is a short tubular portion of large radius one circular end periphery of which is joined to the outer circular periphery of said base flange portion 50b. As indicated in FIG. 1, this oil shield cover 50 is fitted around the power output shaft 4 just to the right in the figure of the ball bearing 6, with the base flange portion 50b facing towards the ball bearing 6, and with the outer surface of the base fitting portion 50e wedged in a lubricating oil sealing manner into a corresponding tubular shape defined on the inside surface of the casing 1, so as to hold the oil shield cover 50 with its half tubular portion 50a extending in the rightwards direction in the figure and positioned partly around the power output shaft 4 and circularly oriented so as to be at the bottom thereof. In this position, the semicircular notch 50d in the middle of said end wall portion 50c receives closely the portion of the power output shaft 4 axially adjacent thereto; in other words, the inner diameter of the half annular end wall portion 50c is only a little larger than the diameter of the power output shaft at its portion axially corresponding thereto. The diameter of the power output shaft 4 at this portion thereof is substantially less than its diameter at its portion which is supported by the ball bearing 6.

With this construction, therefore, the lubricating oil which is sprayed out in radial directions below the horizontal from the orifices 4e as the power output shaft 4 rotates impinges against the inner surface of the half tubular portion 50a of the cover 50 and accumulates therein and then (being barred from rightwards flow by the end wall portion 50c) flows to the left in the figure towards the ball bearing 6 to pass therethrough into the construction comprising the dog clutch described above, etc.. On the other hand, the lubricating oil which is sprayed out in radial directions above the horizontal from the orifices 4e as the power output shaft 4 rotates misses the half tubular portion 50a of the cover 50 and instead impinges against the upper inner surface of the projecting portion 1a of the housing 1. Part of this lubricating oil of course drips down directly to land within the upwardly facing trough defined by the half tubular portion 50a, to flow as before towards and through the ball bearing 6; but quite a large proportion of this lubricating oil on the other hand trickles down the inner surface of the projecting portion 1a of the housing 1 and accumulates in a pool 60 within said projection portion 1a, since as explained previously the wedging contact between the outer surface of the base fitting portion 50e of the cover 50 and the corresponding tubular shape defined on the inside surface of the casing 1 is substantially fluid tight. The level of this pool 60 of lubricating oil rises until it reaches the lowest portion of the periphery of the semicircular notch 50d in the middle of the end wall portion 50c, as illustrated in FIG. 1; of course, subsequent rise of the level of said pool 60 is prevented by spilling of lubricating oil over said end wall portion 50c into the inside of the trough defined by the half tubular portion 50a. This oil pool 60, as indicated in the figure, reaches so high as to wet the lower part of the bearing 4b which supports the right hand end of the power output member 4a in the projecting portion 1a of the housing 1, and accordingly provides very good and positive lubrication for said bearing 4b. Since the diameter of the power output shaft 4 at the portion thereof axially corresponding to the end wall portion 50c, and accordingly the inner diameter of the half annular end wall portion 50c (i.e. of the notch 50d thereof), is substantially less than the diameter of the power output shaft 4 at its portion which is supported by the ball bearing 6, therefore the level of the oil pool 60 is enabled to be sufficiently high. Thus, it will be seen that this oil pool 60 accumulates even at low vehicle speeds and low operating temperatures of the transmission, and even when the viscosity of the lubricating oil is relatively high as when it is still cold or when it has not been changed for a long period of time, and accordingly even in these circumstances, in which problems existed in previous types of power switching and transfer device in lubricating such a rear bearing as the bearing 4b, good and adequate lubrication of the rear bearing 4b can be reliably obtained. This accordingly prolongs the life of the transmission as a whole, and increases its reliability during use.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. For example, although the linking construction between the annular piston and the dog clutch sleeve is shown in the preferred embodiment as incorporating a ball bearing, other types of bearing could be alternatively used, and indeed any of a wide range of device capable of transmitting axial force betweent these members in a substantially circularly isotropic (i.e. symmetrical) manner, while allowing substantially free rotation therebetween, could be used instead. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

What is claimed is:

1. In a transmission device comprising a casing, a power input shaft and a power output shaft, both said power input shaft and said power output shaft being rotatably and coaxially mounted within said housing along a central axis thereof with inner end portions of said power input shaft and said power output shaft being positioned close to one another, the improvement which comprises:

a dog clutch construction comprising:

a first dog clutch member supported by said power input shaft and having an outer diameter and a number of teeth;

a second dog clutch member of substantially the same outer diameter as said first dog clutch member and having the same number of teeth as said first dog clutch member, said second dog clutch member being supported by said power output shaft, said first and second dog clutch members being juxtaposed along said central axis;

a sleeve generally formed as a hollow cylinder with an inner diameter which is substantially equal to the outer diameters of said first and second dog clutch members, said sleeve including teeth on an inner surface thereof which correspond in number and spacing to said teeth on said first and second dog clutch members, said sleeve being fitted over said first and second dog clutch members so as to be slidable thereon along said central axis between a first extreme axial position and a second extreme axial position, in said first extreme axial position said sleeve being located over and being rotationally engaged to only said first dog clutch member, and in said second extreme axial position said sleeve being located over and being rotationally engaged to both said first and said second dog clutch members;

a dog clutch drive assembly comprising an annular power piston adapted to reciprocate in an annular pressure chamber, said annular pressure chamber being formed in said housing along said central axis, said annular power piston having a pressure receiving surface at one axial end thereof, said dog clutch drive assembly further comprising an annular axial force transmitting subassembly arranged along said central axis and engaged with said piston so as to be movable relative to said piston along said central axis within a predetermined range under a biasing force for biasing said piston relative to said axial force transmitting subassembly along said central axis in a direction to reduce the volume of a part of said pressure chamber to which said pressure receiving surface of said piston is exposed and said axial force transmitting assembly also being engaged with said sleeve so as to drive said sleeve axially along said central axis while allowing said sleeve to rotate freely around said central axis; and a means for driving said dog clutch drive assembly along said central axis for selectively either rotationally connecting said power input shaft to said power output shaft through said first and second dog clutch members and said sleeve or disconnecting said power input shaft from said power output shaft, said means for driving comprising a means for selectively supplying said pressure chamber with pressurized fluid, and a means for biasing said piston relative to said housing along said central axis in a direction which will reduce the volume of a part of said pressure chamber to which said pressure receiving surface of said piston is exposed.

2. A dog clutch construction to claim 1, wherein said axial force transmitting subassembly comprises a bearing construction including an inner race member mounted around said sleeve and an outer race member supported by a main portion of said axial force transmitting subassembly.

3. A dog clutch construction according to claim 2, wherein a certain substantial gap is left between said inner race member and said sleeve.

4. A dog clutch construction according to claim 1, wherein said input shaft has an inner end portion which is closer to said output shaft along said central axis than said first dog clutch member and wherein said output shaft has a central bore which extends through said second dog clutch member along said central axis, said central bore receiving said inner end portion of said input shaft, and wherein a bearing means is interposed between said inner end portion of said input shaft and said central bore of said output shaft, said input shaft being formed with a through opening therein which opens at a first end thereof into a space formed between said inner end portion of said input shaft and said central bore of said outpt shaft, said output shaft being further formed with a radial opening which communicates said central bore to an outside surface of said output shaft, said casing enclosing said output shaft with an annular space being defined between said output shaft and said casing to which said radial opening formed in said output shaft communicates, an oil shield cover being mounted in said annular space so as to define an oil pool in a section of said annular space.

5. A dog clutch construction according to claim 4, further comprising a dam member which includes a half annular portion which operates as a dam means for determining a highest level of oil in said oil pool and an annular portion which engages an inner wall surface portion of said housing so as to hold said half annular portion.

6. A dog clutch construction according to claim 1, wherein said piston is formed with a plurality of notches arranged along a peripheral portion of said piston and cut axially in said piston from an axial end of said piston which is opposite to said end of said piston which has said pressure receivng surface, said axial force transmitting subassembly comprising an annular sleeve drive member including a cylindrical portion, a first axial end of said cylindrical portion extending into said annular piston, and a plurality of ear portions of said cylindrical portion extending radially outwardly from a second axial end of said cylindrical portion, said ear portions being arranged so as to correspond to said notches in said piston and to be slidably received in said notches so as to allow said sleeve drive member to move axially relative to said piston, said dog clutch drive assembly further comprising an annular hold member located at said second axial end of said sleeve drive member, said sleeve drive member being fixedly mounted to said piston at peripheral portions thereof, said peripheral portions being located between said notches, said annular hold member functioning to limit the axial movement of said sleeve drive member relative to said piston within said predetermined range.

7. A dog clutch construction according to claim 6, wherein said piston is formed with at least one axially extending first blind hole at an axial end portion of said notch, and wherein a first compression coil spring is partially received in each of said at least one blind hole at a first end portion thereof and wherein said first compression coil spring abuts one of said ear portions of said sleeve drive member which corresponds with said notch in which said at least one axially extending first blind hole is located at a second end of said compression coil spring, said compression coil spring functioning to provide said biasing force for biasing force for biasing said piston relative to said axial force transmitting subassembly.

8. A dog clutch construction according to claim 7, wherein said piston is further formed with at least one second blind hole axially extending in said piston from said axial end which is opposite to said end which has a pressure receiving surface and wherein a second compression coil spring is partially received in each of said at least one second blind hole at a first end portion of said second compression coil spring, said means for driving said dog clutch drive assembly further comprising an annular stop member mounted in said housing, said annular stop member being axially opposed to said dog clutch drive assembly, said second compression coil spring being supported by said annular stop member at a second end of said second compression coil, said second compression coil thereby also functioning to provide said biasing force for biasing said piston relative to said housing.

9. A dog clutch construction according to claim 8, wherein said piston has a stopper portion which engages said annular stop member when said piston is moved for a predetermined stroke length in a direction to increase the volume of said part of said pressure chamber to which said pressure receiving surface is exposed, so that further movement of said piston is prevented.

10. A dog clutch construction according to claim 8, wherein said means for driving said dog clutch assembly further comprises a snap ring engaged in an annular groove formed in an inner wall portion of said housing, said snap ring being adapted to axially support said annular stop member against said biasing force applied thereto by said second compression coil spring, said annular stop member having a peripheral portion, said peripheral portion of said snap ring functioning to prevent engagement of said annular stop member into said annular groove for said snap ring.

* * * * *